Feb. 7, 1939.   E. BURRELL   2,146,393
SOLDERING DEVICE
Filed Nov. 1, 1935

Inventor;-
Ellis Burrell,
By Roland C. Rehm
Atty.

Patented Feb. 7, 1939

2,146,393

UNITED STATES PATENT OFFICE

2,146,393

SOLDERING DEVICE

Ellis Burrell, Chicago, Ill., assignor to Jiggers, Inc., Chicago, Ill., a corporation of Illinois Application November 1, 1935, Serial No. 47,885

5 Claims. (Cl. 113—110)

This invention relates to soldering devices and, among other objects, aims to provide an inexpensive and practicable self-soldering device by which a wire or other splice may be easily and reliably soldered.

The invention may be readily understood by reference to illustrative devices embodying the invention and shown in the accompanying drawing.

It has frequently been proposed heretofore to provide a soldering element carrying its own heat generating compound but such devices have never been commercially successful either because certain practical problems had been ignored in their design or because they did not conform with standard practices or regulations respecting the soldering of wire splices and the like. For example, certain of the aforesaid devices are objectionable because the heat generating substance develops a substantial flame or throws off sparks which constitute a fire hazard and therefore prohibits its use where imflammable materials are present. Others permit the solder to escape before the wire has been heated to a point which allows the solder to spread over and adhere thereto.

In these and other respects have previous devices demonstrated a failure to understand and to solve all the problems involved in the design of a commercially practicable soldering device. The essential characteristics of the latter will appear from a description of the illustrative device and it is therefore unnecessary further to enumerate deficiencies in the devices heretofore proposed.

Figure 1:
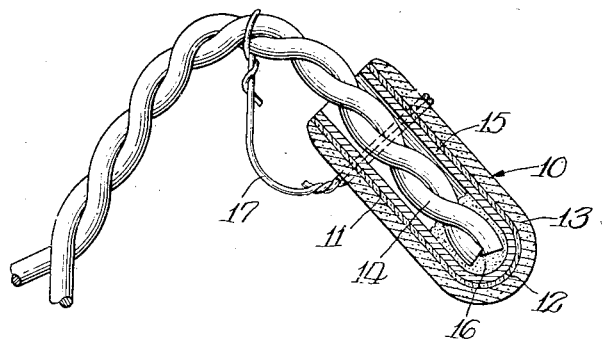
Fig. 1 is a sectional view of a common form of wire splice to which a soldering device has been applied for soldering the splice.

The illustrative device 10 (Fig. 1) is designed to solder together wires or the like whose ends (which generally are required by code or regulation to be twisted together) project in the same direction and therefore present a terminal with a free end. Splices of this character are generally employed in electric wiring systems. While all wire splices are not of this character, it is by far the most common and in many localities it is required by code or regulation covering electric wiring. To prevent the escape of the molten solder, the device is provided with a solder retaining element which functions to retain the solder in molten condition in contact with the wire until the latter has been heated to a point which enables the solder to flow freely over the wire and to adhere thereto. A splice cannot be satisfactorily soldered merely by bringing molten solder into contact therewith. The wire must be heated substantially before the solder will flow over it freely and make an acceptable soldered splice. The solder is however melted long before the wire is heated adequately, and the solder retaining element serves to hold the molten solder during this interval and until such time as the solder will flow freely over the wire. Since the splice in this instance presents a free extremity, the solder retaining element may advantageously be in the form of a cup or thimble 11, one end 12 of which is closed, of a size to slip over the extremity of the splice.

The heat generating compound is advantageously outside the solder retaining element and is separated by the latter from the solder. In this instance the heat generating compound is in the form of an ignitible coating 13 adhering directly to the solder retaining element 11 and is of such a character that it may be ignited readily by a match; and when so ignited will generate enough heat, without developing substantial flame or throwing off heavy sparks, not only to melt the solder but to heat the wire of the splice 14 to a temperature sufficient to allow the solder to flow readily over the wire. Unless the wire be thus heated, the solder, although it may be molten, will not spread over a sufficient area of the wire to provide a properly soldered splice.

One satisfactory compound which possesses the foregoing qualities comprises: barium nitrate as an oxygen supplying substance; finely divided iron or aluminum or a mixture of both constituting an oxidizable substance whose oxidation develops no combustible gases but furnishes heat without flame or objectionable sparking; and a binding substance for binding the ingredients in a coating on the solder retaining element 11.

The proportions of the foregoing ingredients may advantageously be as follows:

Parts by weight
Barium nitrate—$Ba(NO_3)_2$ ------------------ 50
Iron—minus 100 and plus 200 mesh --------- 30
Dextrin or other appropriate water soluble
  binder ------------------------------------ 20
Water -------------------------------------- 20

The compound is thus in a fluid or semifluid state in which form it may readily be applied as a coating to the solder retaining element 11. The coating may advantageously be applied simply by dipping the articles into the heat generating mixture until a sufficiently thick coating has been applied to generate sufficient heat to melt the solder, heat the wires to such temperature as will induce the solder to flow readily over the wire, and to supply enough surplus heat to counteract the high heat conductivity of the wires which are generally copper. The iron employed should preferably not be coarser than 100 mesh nor finer than 200 mesh, thereby to minimize the tendency to throw off sparks. Aluminum increases the intensity of the heat generated but is usually not required for ordinary splices and because of its relatively higher cost, should preferably be used only in such limited quantities as will produce the desired heat.

After application of the generating compound, the articles are of course allowed to dry thoroughly before use. When dry, the binder provides a firm and tough coating.

For reasons given above, the solder may also be in the form of a cup or thimble 15 located inside the solder retaining element 11. The ordinary tin solder employed for this purpose being extremely ductile or extrusible, the solder elements may be formed in cup form from plain blanks by extrusion.

At some stage of manufacture of the soldering device, a small quantity of ordinary non-corrosive fluxing material 16 preferably in paste form, is placed inside the solder element.

The solder retaining element should preferably comprise some material to which solder will not adhere, and may advantageously be made of any cementitious material which is capable of withstanding the moderate temperature developed by the heating compound and will serve as a solder retainer. For example, clay or an enamel made of flint clay and sodium silicate may advantageously be used particularly since they may be supplied in liquid or semi-liquid form and applied as a coating directly upon the previously formed solder elements 15. The aforesaid enamel dries quickly into a strong shell which is so thin that it does not substantially retard transmission of heat to the solder and the wire. If desired retainer forming material of this character may be incorporated in and constitute the binder for the heat generating compound since it will remain as a solder retaining element after the heat generating compound has burned away. There are advantages however in forming a wholly separate retaining element as aforesaid.

The solder retaining cup not only serves to retain the solder but protects the wire and the solder from the direct contact with the heat generating compound or any fumes which may issue therefrom. The solder and the surface of the wire are therefore maintained in such condition as will insure free spreading of the solder over the wire and proper adherence thereto. After use the cup may be removed to present a clean soldered splice free of any destructive substances; the splice may then be wrapped in an approved manner.

As heat is applied by the combustion of the heat generating compound the flux first melts and spreads over and thoroughly cleans the wire. Thereafter the solder melts and is held against escape by the solder retaining element until the wires have been heated sufficiently to induce the solder to spread over them.

The design of the aforesaid soldering device adapts it to extremely low cost manufacture. The solder elements having been made in cup form by extrusion may be dipped directly into the enamel or other retaining cup material one or more times to provide a coating of such thickness as will provide a solder retaining cup of the proper thickness. Thereafter the device may be dipped as aforesaid in the heat generating compound.

It is preferable in the use of the aforesaid elements to arrange the extremity of the wire splice so that it will be horizontal or project slightly downwardly (see Fig. 1), thereby to insure retention of the solder in the solder holder. The latter may advantageously be held against falling off after the solder has been melted by a thin wire 17 which may be bent around the splice by hand sufficiently to hold the splice in place. This, together with the solder retaining cup, may be readily removed after the splice has been soldered.

Figure 2:
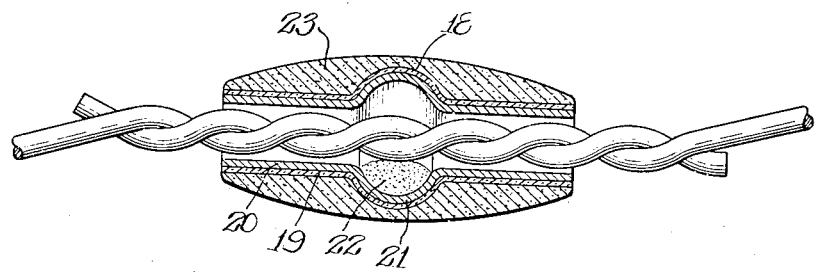
Fig. 2 is a sectional view showing another form of splice with a soldering device applied thereto.
Figure 3:
Fig. 3 is a sectional view of the solder element.
Figure 4:
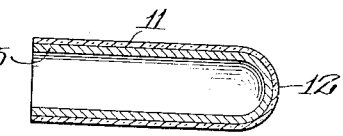
Fig. 4 is a section of the latter and of the solder retaining element.

The precise form of the solder retaining element and of the solder itself will vary for different types of splices. For example, with a so-called cable splice such as is illustrated in Fig. 2, the solder retaining element may be in the form of an open ended sleeve which, if the splice be nearly horizontal, will retain the solder by reason of the latter's surface tension. The sleeve is however preferably formed with an annular bulge 18 intermediate the ends of retainer 19. In all positions of the splice, some portion of the bulge will act as a retaining cup to hold the solder until sufficient heat has been transmitted to the wire to allow the solder to flow over the splice and adhere thereto.

In this form of device the soldering element 20 is also advantageously in sleeve form having an annular bulge 21 in which a quantity of flux paste 22 may be placed. As in the other form of device, the solder retaining element may be provided by dipping the solder element in a coating compound such as in the aforesaid enamel or clay coating compound. Thereafter the heat generating mixture 23 may be applied by dipping the articles in the heat generating compound as aforesaid.

It will be understood that in soldering a splice of the latter type, a soldering device is first slipped over a free end of one wire 24 before the same is twisted together with the wire or wires which constitute the splice. Thereafter the element is drawn back over the splice and the heat generating compound ignited. The depression in the solder element advantageously serves to retain the flux and prevent its being wiped out by the wire as the device is moved back and forth. The portion of the solder retaining cup which remains after the operation can readily be broken by the fingers and will fall off leaving a clean, neatly soldered splice which is of minimum diameter which contributes to compactness of cable joints comprising a large number of separately spliced wires.

Obviously the invention is not limited to the details of the illustrative devices since these may be variously modified. Moreover it is not indispensable that all features of the invention be used conjointly since various features may be used to advantage in different combinations and subcombinations.

Having described my invention, I claim:
1. A soldering device for wire splices and the like comprising in combination a solder element shaped to surround the splice, a thin ceramic shell surrounding said solder element and adapted to hold the solder while in molten condition in contact with the splice to be soldered until the latter has been heated to soldering temperatures, said shell being of such thinness as to be capable of being broken betwen the fingers to permit its removal upon completion of the soldering, and a heat generating material on the exterior of said shell.

2. A wire-splice soldering device comprising in combination a solder element having an imperforate depression therein and having a covering of ceramic material on its exterior which assumes the shape of the exterior of said element and provides a solder retaining shell for holding the solder while in molten condition in contact with the wire until the latter is heated to soldering temperature, and a heat generating compound coating the exterior of said shell adapted to burn to supply heat for the soldering operation, said shell serving also to prevent access of the fumes of said burning compound from the wire splice and the solder and being thin so that it can be readily broken and removed on completion of the soldering operation.

3. A wire-splice soldering device comprising in combination a solder element in the form of a cup adapted to be slipped over the wire splice, said element having a thin covering of ceramic material on its exterior to provide a solder retaining shell for holding the solder while in molten condition in contact with the wire until the latter is heated to soldering temperature, and a heat generating compound coating the exterior of said shell adapted to burn to supply heat for the soldering operation, said shell being so thin that it may be readily broken with the fingers and serving to prevent access of the fumes of said burning compound to the wire splice and the solder.

4. A soldering device for wire splices and the like comprising in combination a solder retaining element which has an imperforate solder retaining recess adapted to retain solder in molten condition in contact with the splice to be soldered until the latter is heated to a temperature to receive the solder, said retaining element being formed of a material to which solder does not adhere and a solder element inside said retaining element, and a heat generating compound on the exterior of said retaining element and separated from the solder thereby adapted to be readily ignited to generate heat without substantial sparks or flame, said solder retaining element having thin fragile walls which facilitate transmission of heat to the solder and render it readily breakable by the fingers to permit removal after solidification of the solder.

5. A method of soldering a wire splice or the like which comprises passing a fragile shell containing solder on its interior over the splice to be soldered, applying heat to the exterior of said shell and preventing direct access of gases and fumes to said solder by means of the shell, and after completion of the soldering breaking the shell and removing it to expose the soldered splice.

ELLIS BURRELL.